United States Patent
Beggs

(10) Patent No.: US 6,467,154 B1
(45) Date of Patent: Oct. 22, 2002

(54) SEAT AND GUIDE INSTALLATION METHOD AND APPARATUS

(75) Inventor: Orrin P. Beggs, Belvidere, IL (US)

(73) Assignee: Unova IP Corp., Woodland Hills, CA (US)

( * ) Notice: Subject to any disclaimer, the term of this patent is extended or adjusted under 35 U.S.C. 154(b) by 0 days.

(21) Appl. No.: 09/488,440

(22) Filed: Jan. 20, 2000

(51) Int. Cl.⁷ .............................. B23P 21/00; B23R 15/00
(52) U.S. Cl. ............................ 29/701; 29/715; 29/718; 29/790; 29/796; 29/888.46; 29/788
(58) Field of Search ......................... 29/701, 703, 771, 29/787, 715, 790, 718, 428, 809, 429, 431, 888.01, 888.011, 888.06, 888.061, 888.4, 888.41, 888.46, 890.124, 282, 244, 280, 788, 796

(56) References Cited

U.S. PATENT DOCUMENTS

| | | | |
|---|---|---|---|
| 2,353,774 A | * 7/1944 | Wagner | 29/280 |
| 3,624,676 A | 11/1971 | Whitney et al. | 29/203 |
| 4,080,730 A | 3/1978 | Woodman, Jr. | 29/701 |
| 4,209,898 A | 7/1980 | Aoki et al. | 29/783 |
| 4,370,788 A | * 2/1983 | Baker | 29/888.061 |
| 4,503,606 A | 3/1985 | Honda et al. | 29/701 |
| 4,543,702 A | 10/1985 | Wada | 29/434 |
| 4,763,391 A | 8/1988 | Yoshioka et al. | 29/33 |
| 4,817,006 A | * 3/1989 | Lewis | 364/476 |
| 4,833,765 A | * 5/1989 | Bohland | 29/799 |
| 4,986,230 A | * 1/1991 | Panyard et al. | 29/888.061 |
| 5,289,634 A | 3/1994 | Makino et al. | 29/890.124 |
| 5,471,738 A | 12/1995 | Burcham et al. | 29/701 |
| 5,531,013 A | * 7/1996 | Nakamura | 29/890.124 |
| 5,539,968 A | 7/1996 | Meyer, Jr. | 29/251 |
| 5,608,956 A | * 3/1997 | Seki | 29/701 |
| 5,970,614 A | * 10/1999 | Adachi et al. | 29/888.061 |
| 6,131,283 A | * 10/2000 | Bove et al. | 29/890.124 |

* cited by examiner

*Primary Examiner*—S. Thomas Hughes
*Assistant Examiner*—Marc Jimenez
(74) *Attorney, Agent, or Firm*—Reising, Ethington, Barnes, Kisselle, Learman & McCulloch, P.C.

(57) ABSTRACT

An apparatus for press fitting inserts into corresponding receptacles in workpieces includes a press comprising a ram and a backup tool spaced from the ram. An insertion tool is alignable between the ram and the backup tool. An insert magazine feeds inserts to the insertion tool. A workpiece positioner sequentially moves each workpiece through receiving positions that align the receptacles with the insertion tool between the ram and the backup tool. The ram repeatedly engages the insertion tool to press fit an insert into each of the corresponding receptacles. The backup tool supports the workpiece against the force of press-fit insertion.

12 Claims, 8 Drawing Sheets

SEAT AND GUIDE INSTALLATION METHOD AND APPARATUS

TECHNICAL FIELD OF THE INVENTION

This invention relates generally to a seat and guide installation apparatus for press fitting inserts such as valve seats and valve guides into corresponding receptacles in a plurality of workpieces such as internal combustion engine heads.

INVENTION BACKGROUND

The prior art includes systems that press fit inserts into corresponding receptacles in workpieces using an articulated robot arm. It is also known for such systems to be controlled by computer numerical controls (CNCs). For example, U.S. Pat. No. 5,471,738 issued Dec. 5, 1995 to Burcham et al., discloses an insert installation apparatus including a robotic system for inserting cylinder liners into the cylinder blocks of internal combustion engines. The Burcham et al. apparatus also includes an articulated robot arm for cycling an end effector between a picking position and a cylinder insertion position. The end effector is attached to the robot arm and is configured to grasp liners held in a tray and to release the liners once the robot arm has deposited them in respective cylinder bores. The apparatus of the Burcham et al. patent also includes a computer numerical control (CNC) connected to the robot arm and programmed to command robot arm movement. However, an apparatus constructed according to the Burcham et al. patent is unable to press fit pluralities of inserts into respective corresponding pluralities of receptacles in each workpiece of a plurality of workpieces. Neither is the Burcham et al. apparatus able to accomplish this in a flexible manner.

In addition, U.S. Pat. No. 5,289,634 issued Mar. 1, 1994 to Makino et al., discloses a valve assembly machine including spring holders that are each configured to drop a spring into a receptacle in a valve body. The Makino et al. machine also includes spool holders that are each configured to drop an insert in the form of a spool into or near a valve body receptacle. The valve assembly machine of the Makino et al. patent also includes jaw sets that repeatedly clamp onto and release the spools until they are correctly aligned with and received into their respective valve body receptacles. A spring cassettor is mounted on a rotating turret and is configured to hold springs for the spring holders to retrieve. The Makino et al. machine also includes a spool holder mounted on the turret and configured to hold spools for the spool holders to retrieve. However, a valve assembly machine constructed according to the Makino et al. patent is unable to press fit inserts into receptacles in a workpiece or to position more than one plurality of inserts in respective separate pluralities of receptacles in a workpiece or in a plurality of like workpieces.

INVENTION SUMMARY

A seat and guide installation apparatus for press fitting inserts into corresponding receptacles in a plurality of workpieces is provided. The apparatus includes a press comprising a ram supported on a base and a backup tool supported on the base and spaced from the ram. A first insertion tool is supported on the base and is alignable between the ram and the backup tool. The first insertion tool is configured to sequentially press fit a first plurality of like inserts into respective complementary receptacles in a workpiece. The ram is configured and positioned to repeatedly engage the insertion tool to individually press fit each insert of the first plurality of inserts into respective ones of the complementary receptacles, the backup tool being configured to support the workpiece against the force of press-fit insertion. The seat and guide installation apparatus also includes a first insert magazine supported on the base and configured to sequentially align each of the first plurality of inserts with the first insertion tool.

Unlike the prior art, the seat and guide installation apparatus also includes a workpiece positioner that is supported adjacent the press and is configured to sequentially move a workpiece that includes moving the first plurality of receptacles into a first plurality of receiving positions such that each receptacle of the first plurality of receptacles is moved sequentially into alignment with the first insertion tool between the ram and the backup tool. This allows the first insertion tool to press fit each insert of the first plurality of inserts into corresponding ones of the first plurality of receptacles. Therefore, an insert installation apparatus constructed according to the invention is better able to press fit a plurality of inserts into respective corresponding receptacles in a plurality of workpieces in an assembly line manufacturing process. Moreover, such an apparatus is capable of operating in a flexible manner such that workpieces of varying configurations and having receptacles of various sizes and spacings may be fitted with inserts by a single apparatus without retooling.

According to another aspect of the invention, the apparatus is configured to press fit more than one plurality of inserts into respective separate pluralities of receptacles in a workpiece.

The invention also includes a method for press fitting inserts into corresponding receptacles in a plurality of workpieces. According to this method, inserts are press fit into corresponding receptacles in a plurality of workpieces by supporting a press on a base, the press comprising a ram and a backup tool spaced from the ram. First and second insertion tools are supported on a shuttle movably supported on the base. First and second insert magazines and escapements are supported on the shuttle in front of the first and second insertion tools, respectively. First and second pluralities of inserts are provided in the first and second insert magazines, respectively. A workpiece positioner is supported adjacent the press. The shuttle is moved to align the first insertion tool between the ram and the backup tool. The workpiece positioner is then actuated to move a workpiece sequentially through a first plurality of receiving positions. In each receiving position respective ones of a first plurality of receptacles in the workpiece are each aligned with the first insertion tool between the ram and the backup tool. Each insert of the first plurality of inserts is serially press fit in a corresponding one of the first plurality of receptacles by actuating the ram to engage the first insertion tool when the workpiece is in each position of the first plurality of receiving positions. The steps of moving the shuttle, moving the workpiece, and press fitting the inserts are then repeated for the second plurality of inserts, the second insertion tool, a second plurality of receptacles in the workpiece and a second plurality of receiving positions.

Objects, features and advantages of this invention are to provide a seat and guide assembly machine that provides high product quality by quickly, efficiently accurately and automatically installing intake and exhaust valve seats and valve guides in internal combustion engine heads while being sufficiently agile to provide significantly shorter lead times for introducing new engine head designs, is flexible and ungradable at an affordable cost, is adaptable to heads of a variety of configurations and having varying numbers of intake and exhaust ports, can accommodate intake and exhaust seats and valve guides having a wide variety of sizes and configurations, has a capacity to adapt to and absorb newly emerging technology, requires a relatively small area of floor space, detects improper insertion and thereby increases part reliability, reduces production cost, and reduces warranty claim expense.

BRIEF DESCRIPTION OF THE DRAWINGS

These and other objects, features and advantages of this invention will be apparent from the following detailed description of the preferred embodiment(s) and best mode, appended claims, and accompanying drawings in which:

DETAILED DESCRIPTION OF THE PREFERRED EMBODIMENTS

Figure 1:
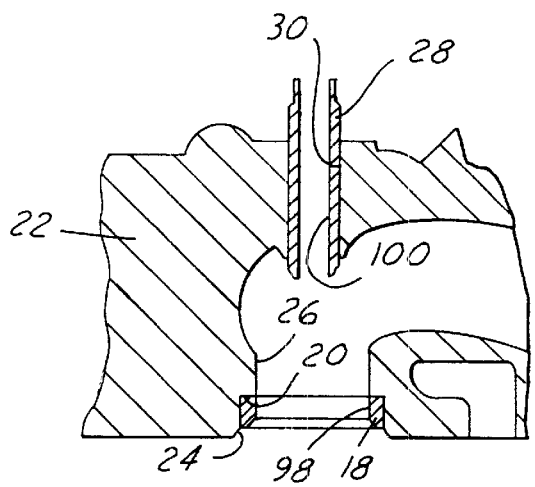
FIG. 1 is a partial cross-sectional side view of an engine head showing placement of valve guides and valve seats accomplished by an apparatus constructed according to the invention.
Figure 2:
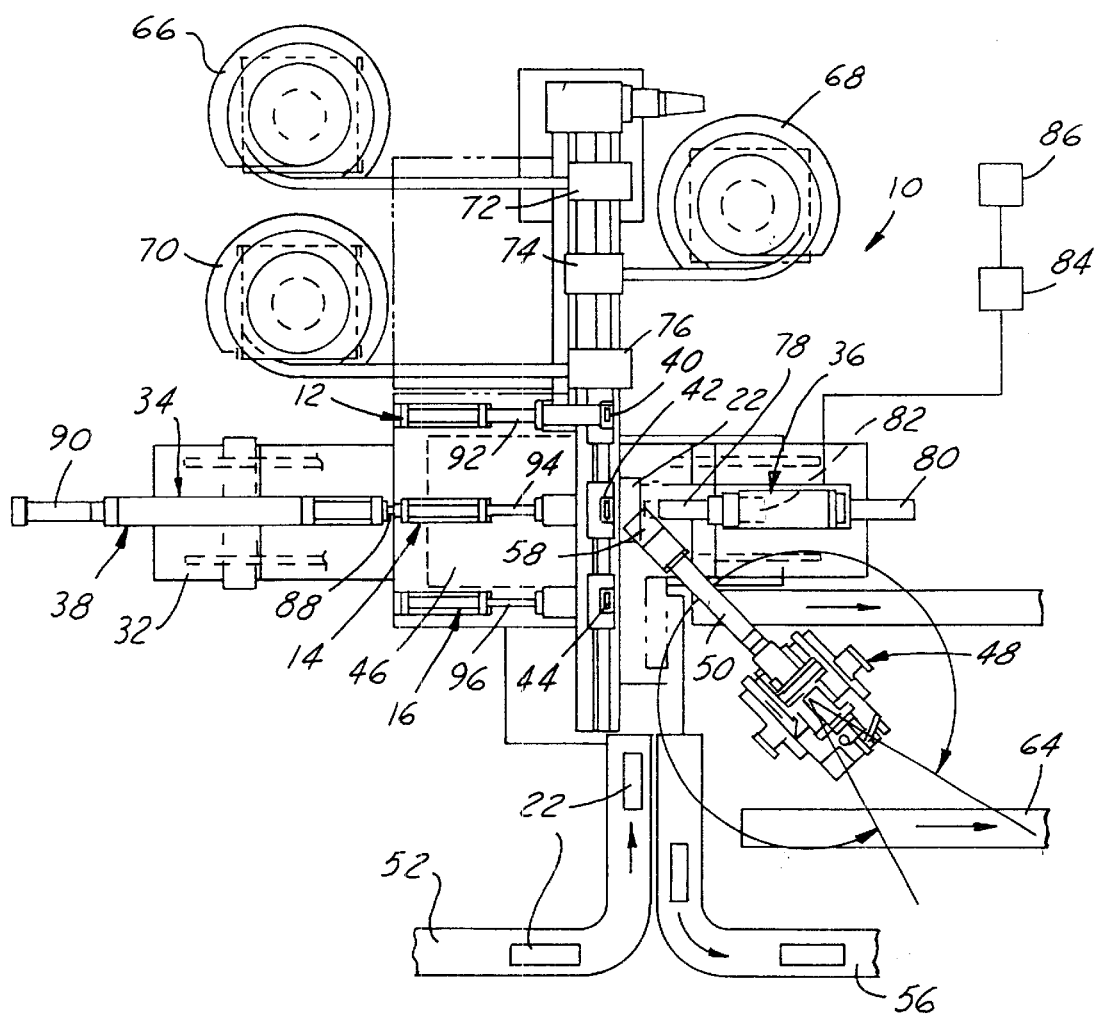
FIG. 2 is a schematic plan view of a seat and guide installation apparatus constructed according to a first embodiment of the invention and with a shuttle portion of the invention shown in a second position with a second insertion tool of the apparatus aligned with a press portion of the apparatus.
Figure 3:
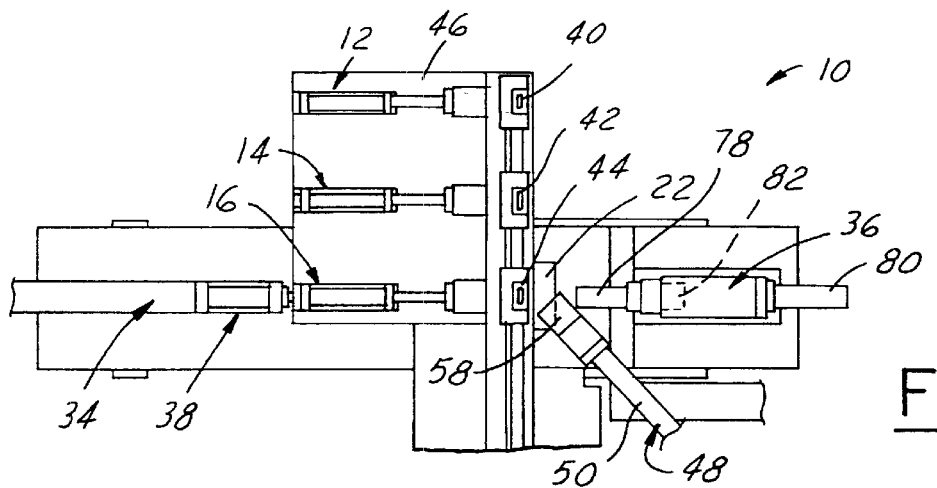
FIG. 3 is a partial schematic plan view of the apparatus of FIG. 2 showing the shuttle in a third position with a third insertion tool of the apparatus aligned with the press.
Figure 4:
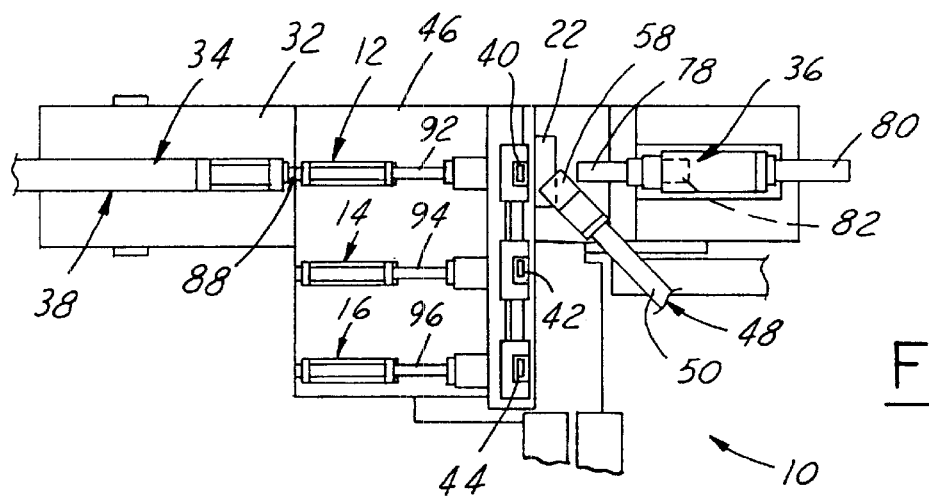
FIG. 4 is a partial schematic plan view of the apparatus of FIG. 2 showing the shuttle in a first position with a first insertion tool of the apparatus aligned with the press.
Figure 5:
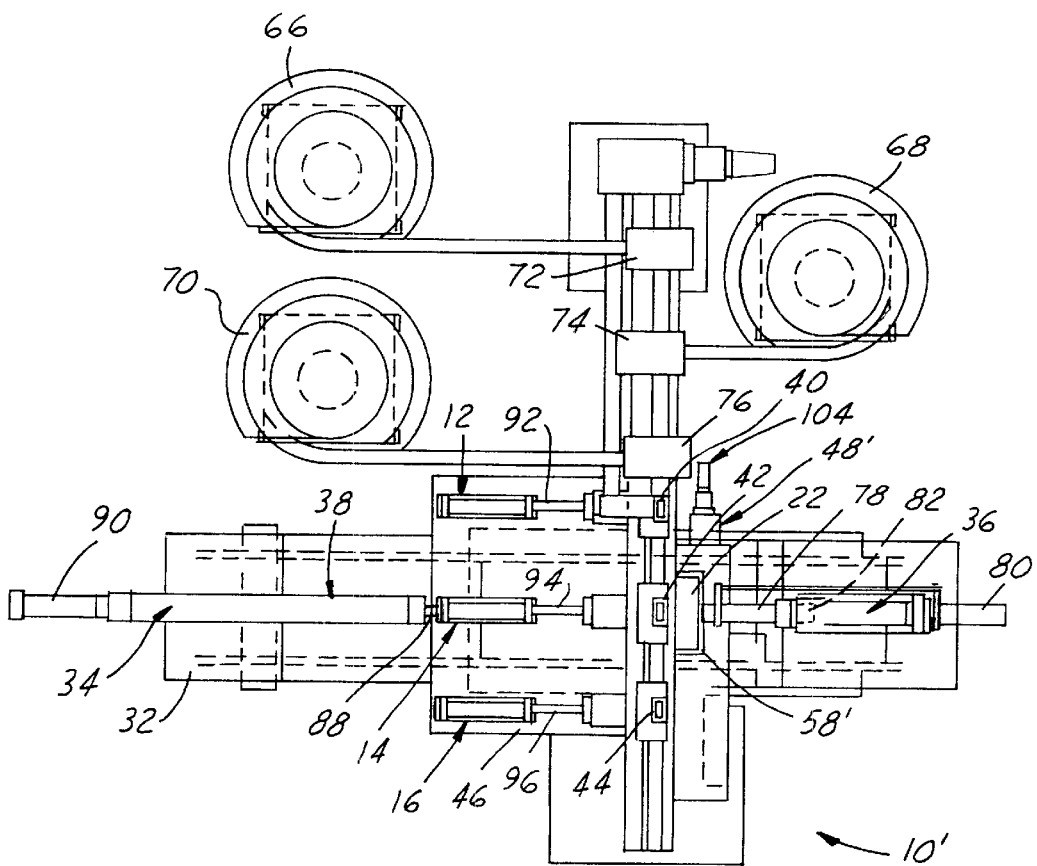
FIG. 5 is a schematic plan view of a seat and guide installation apparatus constructed according to a second embodiment of the invention.

An apparatus 10 for press fitting inserts such as valve seats and valve guides into corresponding receptacles in a plurality of workpieces such as a series of internal combustion engine heads 22 is generally shown in FIGS. 2 through 4. A second embodiment of such an apparatus is generally shown at 10 in FIG. 5. In the embodiment of FIG. 5, those items corresponding to similar items in the embodiment FIGS. 1 through 4, are identified with primed numerals. Identical items carry the same numerals.

As shown in FIGS. 2–4, the apparatus 10 includes first, second and third insertion tools 12, 14 and 16, respectively, that are configured and positioned to receive, hold and sequentially press fit pluralities of intake valve seats, exhaust valve seats and valve guides, respectively, into respective intake valve seat, exhaust valve seat and valve guide receptacles in each of a plurality of internal combustion engine heads 22. As shown in FIG. 1, valve seats 18 are typically received in valve seat receptacles 20 formed in an engine head 22 around an outer opening 24 of an intake or exhaust port 26. As is also shown in FIG. 1, valve guides 28 are typically received in tubular valve guide receptacles 30 formed in an engine head 22 in coaxial alignment with the intake and exhaust port openings 18.

As shown in FIG. 2, the insertion tools 12, 14, 16 are movably supported on a base 32 and are alignable between a ram 34 and a back-up tool 36 of a press 38 that is rigidly supported on the base 32. The apparatus 10 also includes separate intake seat, exhaust seat and valve guide shuttle magazines 40, 42 and 44 movably supported on the base 32 adjacent the respective insertion tools 12, 14, 16. The shuttle magazines 40, 42, 44 are configured to feed the respective pluralities of intake seats, exhaust seats and valve guides to the first, second and third insertion tools 12, 14, 16, respectively. The shuttle magazines 40, 42, 44 include respective escapement mechanisms to guide, align and position each seat and guide with the respective first, second and third insertion tools 12, 14, 16 in respective positions to be press fit into corresponding receptacles as described above.

The back-up tool 36 of the press 38 is spaced from the ram 34 portion of the press 38 and is configured to support heads 22 against the force of press fit insertion. The ram 34 is configured and positioned to repeatedly engage whichever insertion tool has been moved into alignment between the ram 34 and the back-up tool 36 to individually press fit inserts into corresponding receptacles in an engine head 22. The three insertion tools 12, 14, 16 are mounted in a parallel spaced apart orientation on a generally rectangular shuttle 46 that moves each of the insertion tools in and out of alignment between the ram 34 and the backup tool 36. The three magazines 40, 42, 44 are also supported on the shuttle 46 adjacent the respective insertion tools 12, 14, 16 that they are configured to feed. The shuttle 46 moves the insertion tools 12, 14, 16 and shuttle magazines 40, 42, 44 relative to the base 32 between a first position aligning the first insertion tool 12 between the ram 34 and back-up tool 36, a second position aligning the second insertion tool 14 between the ram 34 and the back-up tool 36, and a third position aligning the third insertion tool 16 between the ram 34 and the back-up tool 36. The first position is shown in FIG. 4, the second position in FIG. 2 and the third position in FIG. 3.

As shown in FIGS. 2–4, the apparatus 10 also includes an engine head positioner 48 that comprises an articulated robot arm 50 supported adjacent the press 38 and configured to retrieve one engine head 22 at a time from a supply conveyor 52 (FIG. 2). The robot arm 50 is also configured to sequentially move each retrieved head 22 through first, second and third pluralities of receiving positions between the insertion tools 12, 14, 16 and the backup tool 36 of the press 38. As the robot arm 50 moves each head 22 through the first plurality of receiving positions, each intake seat receptacle in each intake port of the head 22 is moved sequentially into alignment with the first insertion tool between the ram 34 and the back-up tool 36 to allow the first insertion tool 12, when advanced by the ram 34, to press fit each intake seat into corresponding intake seat receptacles 20 in intake ports 26 formed in the head 22. As the robot arm 50 moves each head 22 through the second plurality of receiving positions, each exhaust seat receptacle is moved sequentially into alignment with the second insertion tool 14 between the ram 34 and the back-up tool 36 to allow the second insertion tool 14 to press fit each exhaust seat into corresponding exhaust seat receptacles in exhaust ports 26 formed in the head 22. As the robot arm 50 moves each head 22 through the third plurality of receiving positions, each valve guide receptacle in the head 22 is moved sequentially into alignment with the third insertion tool 16 between the ram 34 and the back-up tool 36 to allow the third insertion tool 16, when advanced by the ram 34, to press fit each valve guide into corresponding valve guide receptacles 30 in the intake and exhaust ports 26 of the head 22. Because the valve guide receptacles 30 are disposed co-axially in the same ports as the intake seat and exhaust seat receptacles, the third plurality of receiving positions is the same as the first and second pluralities of receiving positions. Once it has positioned an engine head 22 for press fitting of all intake seats, exhaust seats and valve guides, the robot arm 50 places the head 22 on a discharge conveyor 56.

The robot arm 50 also includes and end-effector shown at 58 in FIGS. 2–4. The end-effector 58 is connected to a distal end of the robot arm 50 and is configured to alternately grasp, rotate, hold and release a single engine head 22 at a time.

Figure 7:
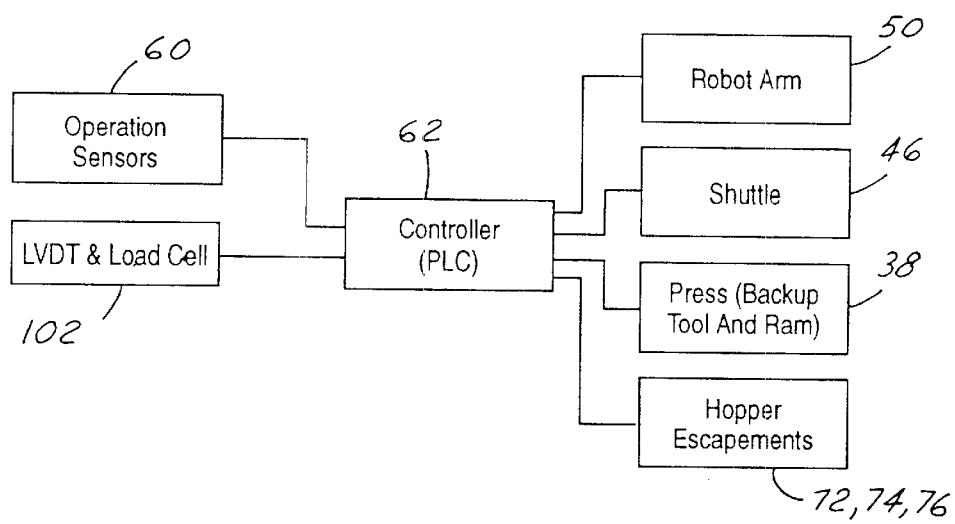
FIG. 7 is a schematic block diagram of a controller, sensors, robot arm, shuttle, press and hopper escapements connected according to the invention.

As shown in FIG. 7, the ram portion 34 of the press 38 includes operation sensors 60 connected to the press ram 34. The operation sensors 60 are configured to signal a controller 62 to command the robot arm 50 to deposit an engine head 22 on a reject conveyer, shown at 64 in FIG. 2, when one of the operation sensors 60 detects that press fit insertion of any intake seat, exhaust seat or valve guide into a port of the engine head 22 requires a significantly greater than normal amount of force, no force, or that the inserted element is not properly positioned.

The apparatus 10 includes first, second and third hoppers shown at 66, 68 and 70, respectively, in FIG. 2. The hoppers 66, 68, 70 are spiral-feed devices that supply intake seats, exhaust seats and valve guides, respectively, to the first, second and third stationary magazines and escapements 72, 74, 76, respectively. The shuttle 46 is movable to a reload position in which the intake seat, exhaust seat and valve guide shuttle magazines 40, 42, 44 are positioned adjacent the respective first, second and third stationary magazines and escapements 72, 74, 76. The hoppers 66, 68, 70 are configured to initially feed and then to subsequently resupply seats and guides to the shuttle magazines 40, 42, 44 through respective stationary magazines and escapements 72, 74, 76 when the shuttle 46 is in the reload position. Each time the shuttle 46 is moved to the reload position the escapement 72 for the first hopper is programmed to open and release a number of intake seats into the intake seat shuttle magazine 40 that is necessary to fill all the intake seat receptacles in the engine head intake ports 26 that the seats are to be press fit into. Likewise, with each reload, the escapement 74 of the second hopper 68 is programmed to open and release a number of exhaust seats into the exhaust seat shuttle magazine 42 that is necessary to fill all the exhaust seat receptacles in the head 22 exhaust ports 26. Similarly, the third hopper escapement 76 is programmed to open and release into the valve guide shuttle magazine 44 the number of valve guides necessary to fill all the intake and exhaust valve guide receptacles in the head intake and exhaust ports 26. To insure that there is sufficient stack pressure in each of the magazines 40, 42, 44 mounted on the shuttle 46, each shuttle magazine 40, 42, 44 is constructed to hold 4 to 5 extra seats or guides beyond what is necessary to supply the insertion tools 12, 14, 16 with sufficient seats and guides to press fit them into the receptacles of all intake and exhaust ports of a given head 22.

The back-up tool 36 includes an abutment rod or shaft 78 mounted in an AMLOK® bushing 82 and connected to an air cylinder 80. When actuated, the air cylinder 80 drives the shaft 78 into soft touch contact with the head 22, opposite a receiving intake or exhaust port in the head 22. The AMLOK® bushing is a squeeze bushing 82 configured and positioned to clamp the abutment shaft 78 into position against the head 22. The back-up tool 36 also includes an air over oil pressure intensifier 84 connected between the AMLOK® bushing 82 and a source of pressurized air 86. The intensifier 84 provides hydraulic pressure at 1500 PSI to securely clamp the shaft 78 against head 22 in each position of the three pluralities of receiving positions for each head 22.

The ram 34 portion of the press 38 includes a ram rod 88 connected to a pusher cylinder 90 which, when actuated, advances the ram rod 88 to push or pull one of the insertion tools 12, 14, 16. Ram rod 88 is configured with a "T" to engage a T-slot in the corresponding insertion tool 12, 14, 16. Each insertion tool 12, 14, 16 includes an insertion rod 92, 94, 96 configured and positioned to engage a valve seat 18 or valve guide 28 that a respective shuttle magazine 40, 42, 44 has dispensed into a position to be press fit into its corresponding receptacle in the head 22. As shown in FIG. 1, the intake and exhaust seats 18 include central bores 98 and the valve guides include central bores 100. The insertion rods 92, 94, 96 are configured with an axially projecting locator to spear or telescope into the central bore 98,100 of the respective valve seat or guide that has been dispensed into a position between the insertion rod and the head for press fit insertion.

The ram 34 also includes both a linear variable transducer device "LVTD" and a load cell 102 configured to measure the extent of insertion and the force of insertion of each part inserted into a head 22. The load cell 102 is configured to continuously measure the force of insertion along the entire distance that each part is pressed into its respective corresponding intake or exhaust port in a head 22. The load cell 102 provides a signal to the controller 62 during each insertion that allows the controller 62 to monitor insertion force at each discrete position along the insertion path and compare insertion force to minimum and maximum allowable values. If, at any time during the insertion of any part and at any position along the insertion path the load cell 102 detects an insertion force value in excess of the maximum or less than the minimum value, the controller 62 is configured to command the back-up tool 36 to retract and to command the robot arm 50 to place the head 22 on the reject conveyer 64 as described above.

As shown in FIG. 7, the controller 62 includes a programmable logic controller "PLC" and is operatively connected to the robot arm 50, the ram 34, the back-up tool 36 and the shuttle 46. The controller 62 is configured to command all movements of these components of the apparatus 10. The PLC is also programmed to command the ram 34 to strike or "rap" each insertion tool after press fitting each part to insure that the newly press 38-fit part is bottomed. The ram 34 causes the insertion tools to strike (rap) each part several times to insure that each part is fully bottomed out in its corresponding receptacle.

According to the second embodiment of the invention shown in FIG. 5, the engine head positioner 48' comprises a servo slide 104 rather than a robot arm 50. The servo slide 104 has a horizontally and vertically adjustable engine head holder, schematically shown at 58' in FIG. 5. The servo slide 104 retrieves each head 22 from the supply conveyor 52 and moves each head 22 through the three sets or pluralities of receiving positions before depositing each head 22 on the discharge conveyer 56.

Figure 6A:
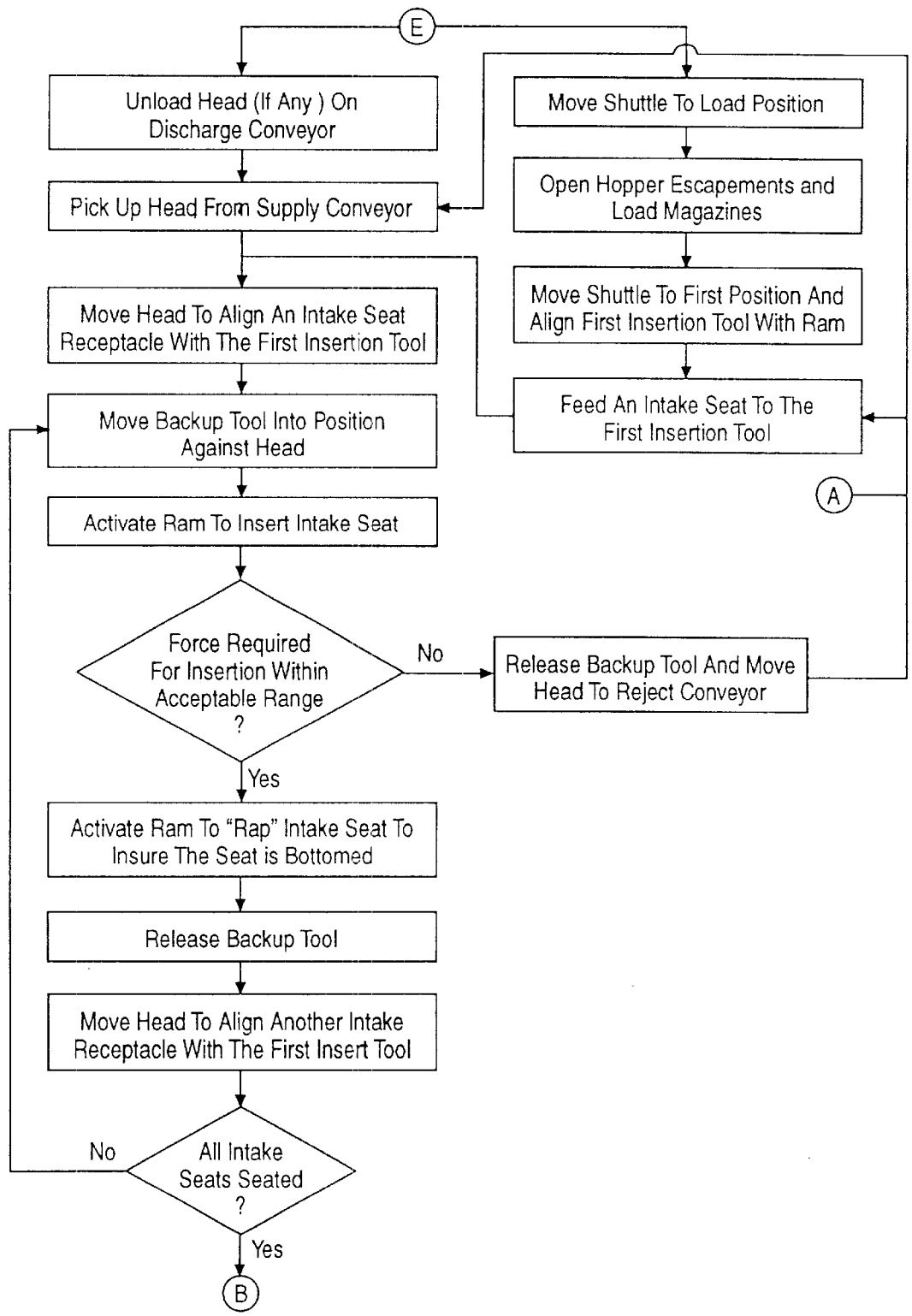
FIG. 6A is a first portion of a flow chart showing the steps of a method executed according to the inventive method.

In practice, inserts such as valve seats and valve guides can be press fit into corresponding receptacles in each of a plurality of work pieces such as internal combustion engine heads 22 by using and cycling apparatus 10 as shown in FIGS. 6A through 6D. As shown in FIG. 6A, the shuttle 46 is first moved to the load position and the three stationary hopper magazines and escapements 72, 74, 76 are opened to load intake and exhaust seats and valve guides into their respective shuttle magazines 40, 42, 44 on the shuttle 46. The shuttle 46 is then moved to the first position, aligning the first insertion tool 12 between the ram 34 and the back-up tool 36. The first shuttle magazine 40 positions an intake seat between the first insertion tool 12 and the head 22, the head 22 being located by the engine positioner 48. The back-up tool 36 is then moved into position against the head 22 and the ram 34 is activated to insert the intake seat into its corresponding receptacle in an intake port of the head 22. If the force required for inserting the intake seat is not within a predetermined acceptable range, or the full forward position is not within limits, the back-up tool 36 is retracted, and the head 22 is moved to an unload position. The head 22 is unloaded and a new head is place into the head positioner 48. The above steps are then repeated. If the force required for insertion and the position of the intake seat are within predetermined acceptable ranges, the ram 34 is then activated to rap the intake seat several times to ensure that the seat is bottomed. The back-up tool 36 is then retracted and the head 22 is moved to align another intake receptacle with the first insertion tool 12. The above steps are repeated until all intake seats have been seated in their respective receptacles in the intake ports of the head 22.

Figure 6B:
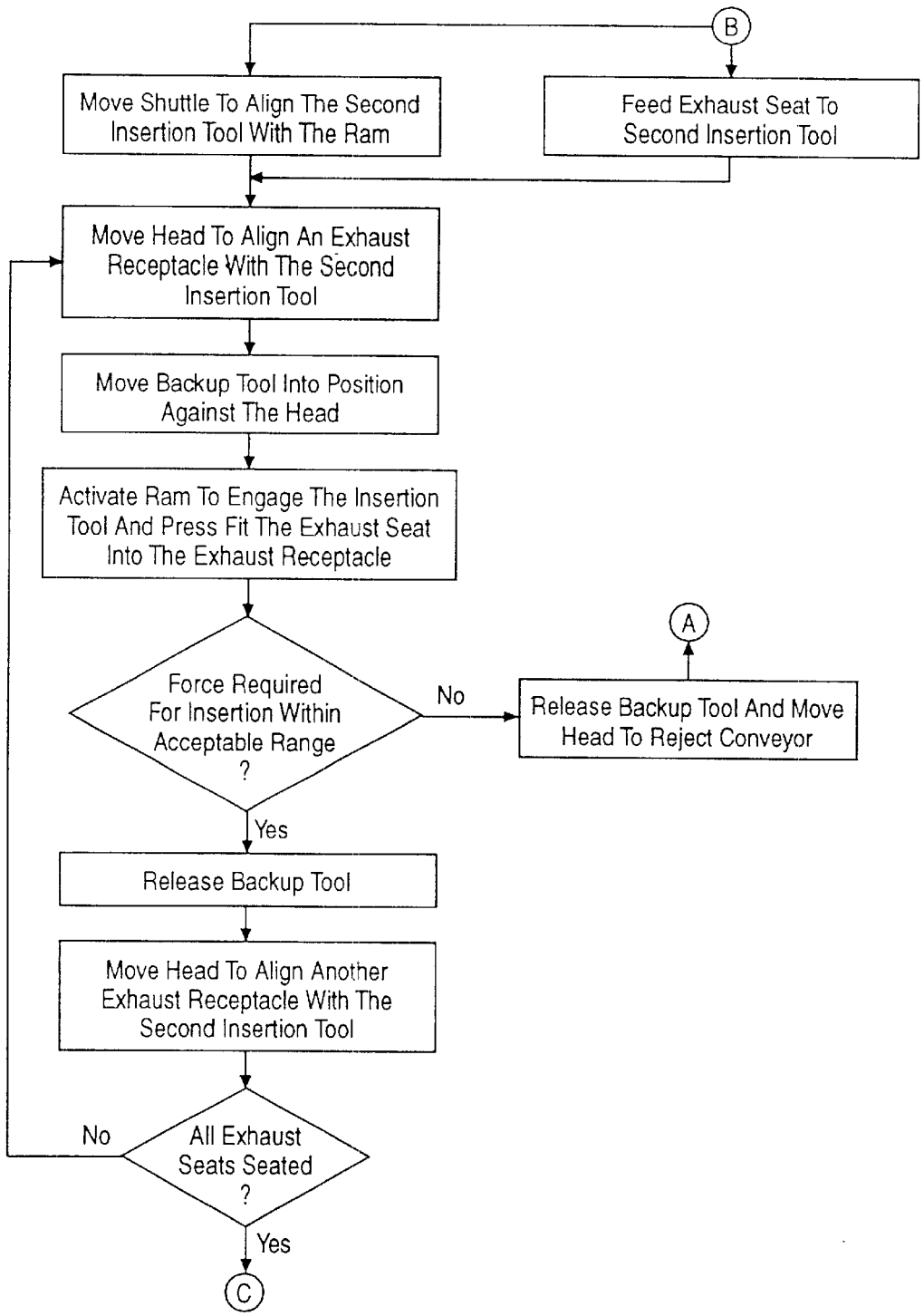
FIG. 6B is a continuation of the flow chart of FIG. 6A.

As shown in FIG. 6B, the shuttle 46 is then moved to align the second insertion tool 14 with the ram 34 as an exhaust seat is fed to the second insertion tool 14. The head 22 is then moved to align an exhaust receptacle with the second insertion tool 14 and the back-up tool 36 is moved into position against the head 22. The ram 34 is then activated to engage the insertion tool 14 and to press fit the exhaust seat into a corresponding receptacle in an exhaust port of the engine head 22. If the force required for inserting the exhaust seat is not within a predetermined acceptable range, or the full forward position is not within limits, the back-up tool 36 is retracted, the head 22 is moved to the unload position. The process is then begun again with the retrieval and loading of a new head 22 to the head positioner 48 and the press fitting of intake seats. If the force required for inserting the exhaust seat and the position of the exhaust seat are within predetermined acceptable ranges, the back-up tool 36 is retracted and the head 22 is moved to align another exhaust receptacle with the second insertion tool 14. The process is repeated until all the exhaust seats have been press fit into their corresponding receptacles in the intake and exhaust ports 26 of the head 22.

Figure 6C:
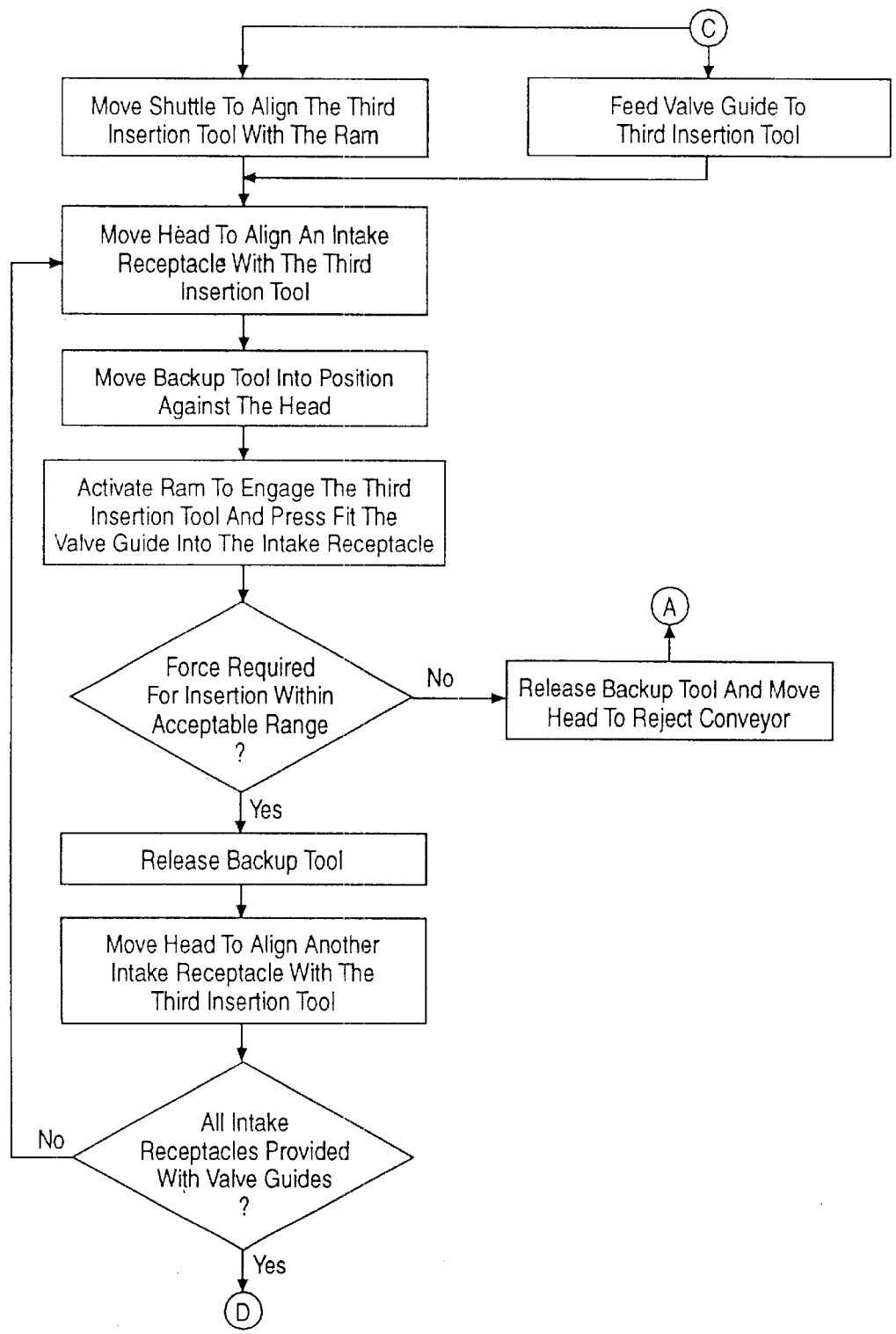
FIG. 6C is a continuation of the flow chart of FIGS. 6A and B.

As shown in FIG. 6C, the shuttle 46 is then moved to align the third insertion tool 16 with the ram 34 as a valve guide is fed into position in front of the third insertion tool 16 from the valve guide shuttle magazine 44. The head 22 is then moved to align an intake port with a third insertion tool 16 and the back-up tool 36 is moved into position against the head 22. The ram 34 is then activated to engage the third insertion tool 16 and to press fit the valve guide 28 into the valve guide receptacle 30 within the intake receptacle. If the force required for inserting the valve guide into its receptacle is not within acceptable range, then the back-up tool 36 is released and the head 22 is moved to the unload position, once again starting the process at the beginning with the retrieval of a new head 22. If the force required for insertion is within the acceptable range then the back-up tool 36 is released and the head 22 is moved to align another intake receptacle with the third insertion tool 16.

Figure 6D:
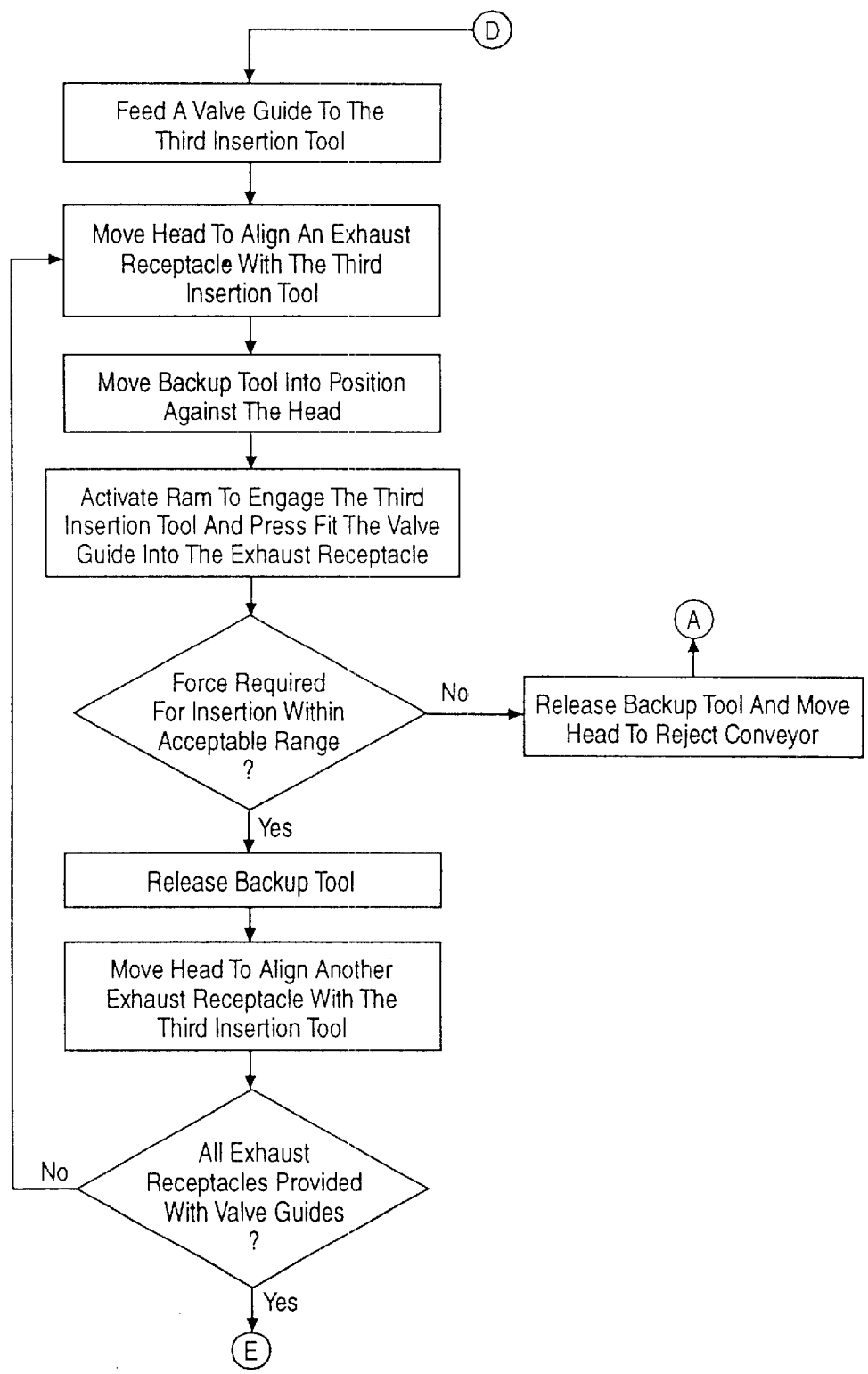
FIG. 6D is a continuation of the flow chart of FIGS. 6A–C.

Once all the intake receptacles have been provided with valve guides, the valve guide shuttle magazine 44 feeds another valve guide to the third insertion tool 16 as shown in FIG. 6D. The head 22 is then moved to align an exhaust port with the third insertion tool 16 and the back-up tool 36 is moved into position against the head 22. The ram 34 is then activated to engage the third insertion tool 16 and to press fit the valve guide into the exhaust receptacle. Again, if the force required for insertion is not within the predetermined acceptable range, the back-up tool 36 is released and the head 22 is moved to the unload position. The process is then started all over again with the retrieval and loading of an additional head 22. If the force required for insertion is within the acceptable range, then the back-up tool 36 is released and the head 22 is moved to align another exhaust receptacle with the third insertion tool 16. Once all the exhaust receptacles have been provided with valve guides, the head 22 is moved to the unload position, unloaded and a new head 22 is loaded from a supply conveyor to begin the process of press fitting seats and guides 28 into the intake and exhaust ports 26 of another head 22.

A seat and guide assembly machine constructed and employed as described above provides a fully flexible means of quickly, efficiently and accurately installing intake and exhaust valve seats and valve guides in internal combustion engine heads. Different engine head configurations having different numbers of intake and exhaust ports or intake and exhaust ports disposed in different locations or at different angles in a head can be accommodated by simply reprogramming the controller 62 to move each head to different sets of receiving positions. Simple end tooling configurations for the insertion tools 12, 14, 16 and magazines 40, 42, 44 can accommodate intake and exhaust seats and valve guides having a wide variety of sizes and configurations. Also, as described above, the magazines 40, 42, 44 each hold more then enough parts to fill each receptacle in the heads of most internal combustion engines. Simple change tooling for the hoppers 66, 68, 70 can also accommodate intake and exhaust seats and valve guides having a wide variety of sizes and configurations. The stationary magazines and escapements 72, 74, 76 can be cycled, as described above, to release only the number of parts necessary to fill the number of intake and exhaust seats in a given engine head. Both the use of "rapping" to ensure that seats are properly bottomed in their receptacles and the use of LVTDs and load cells to detect improper insertion, greatly increases part reliability and reduces warranty claim expenses.

The description and drawings set forth presently preferred embodiments of the invention in an illustrative manner. The description uses terminology that is intended to describe these embodiments and is not intended to limit the scope of the invention. Obviously, it is possible to make many modifications and variations of the present invention in light of the above teachings. Therefore, within the scope of the appended claims, the invention may be practiced otherwise than as the description and drawings specifically show and describe.

What is claimed is:

1. A seat and guide installation apparatus for press fitting inserts into corresponding receptacles in a plurality of workpieces, the apparatus comprising:

a press comprising a ram supported on a base and a backup tool supported on the base and spaced from the ram;

a first insertion tool supported on the base, alignable between the ram and the backup tool and configured to sequentially press fit each insert of one of a first plurality of valve guide inserts and a first plurality of valve seat inserts into a corresponding one of a plurality of complementary receptacles in one of an engine cylinder head workpiece and an engine cylinder block workpiece, the ram being configured and positioned to repeatedly engage the insertion tool to individually press fit each insert of the first plurality of inserts into respective ones of the complementary receptacles, the backup tool being configured to support the workpiece against the force of press-fit insertion;

a first insert magazine supported on the base and configured to sequentially move each of the first plurality of inserts relative to and into alignment with the first insertion tool when aligned with the ram; and a movable workpiece positioner supported adjacent the press and configured to sequentially move the same workpiece including the complementary receptacles relative to the ram and the first insertion tool into a first plurality of receiving positions such that each receptacle of the complementary receptacles is moved sequentially relative to and into alignment with the ram and first insertion tool when aligned with the ram and between the first insertion tool and the backup tool to allow the first insertion tool when actuated by the ram to press fit each insert of the first plurality of inserts into corresponding ones of the complementary receptacles in the same workpiece.

2. A seat and guide installation apparatus as defined in claim 1 in which the ram includes operation sensors connected to the workpiece positioner and configured to signal the workpiece positioner to deposit a workpiece on a reject conveyor when one of the operation sensors detects that press fit insertion of any insert into the workpiece requires a greater than normal amount of force.

3. A seat and guide installation apparatus as defined in claim 1 in which the workpiece positioner comprises a servo slide having a horizontally and vertically adjustable workpiece holder.

4. A seat and guide installation apparatus as defined in claim 1 in which the workpiece positioner comprises a robot arm.

5. A seat and guide installation apparatus as defined in claim 1 in which a computer numerical control is operatively connected to the workpiece positioner.

6. A seat and guide installation apparatus for press fitting inserts into corresponding receptacles in a plurality of workpieces, the apparatus comprising:

a press comprising a ram supported on a base and a back-up tool supported on the base and spaced from the ram;

a first insertion tool supported on the base, alignable between the ram and the backup tool and configured to sequentially press fit each insert of a first plurality of inserts into a corresponding complementary receptacle in a workpiece, the ram being configured and positioned to repeatedly engage the insertion tool to individually press fit each insert of the first plurality of inserts into respective ones of the complementary receptacles, the backup tool being configured to support the workpiece against the force of press-fit insertion;

a first insert magazine supported on the base and configured to sequentially align each of the first plurality of inserts with the first insertion tool;

a workpiece positioner supported adjacent the press and configured to sequentially move a workpiece including the complementary receptacles into a first plurality of receiving positions such that each receptacle of the complementary receptacles is moved sequentially into alignment with the first insertion tool between the ram and the backup tool to allow the first insertion tool to press fit each insert of the first plurality of inserts into corresponding ones of the complementary receptacles;

a second insertion tool supported on the base and configured to hold each insert of a second plurality of like inserts for individual press fit insertion into respective complementary receptacles of a second plurality of receptacles in the workpiece; and a second insert magazine configured to successively align each insert of the second plurality of inserts with the second insertion tool, the first and second insertion tools and first and second insert magazines being supported on a shuttle for reciprocal movement on the base between a first position aligning the first insertion tool between the ram and backup tool and second position aligning the second insertion tool between the ram and the backup tool, the workpiece positioner being supported adjacent the ram and backup tool and configured to sequentially move the workpiece into a second plurality of receiving positions when the shuttle is in the second position such that each receptacle of the second plurality of receptacles is moved sequentially into alignment with the ram between the second insertion tool and the backup tool.

7. A seat and guide installation apparatus as defined in claim 6 in which:

a third insertion tool is supported on the shuttle and is configured to hold each insert of a third plurality of like inserts for individual press fit insertion into respective complementary receptacles of a third plurality of receptacles in the workpiece;

a third insert magazine is supported on the shuttle and is configured to sequentially align each insert of the third plurality of inserts with the third insertion tool;

the first, second and third insertion tools and magazines are mounted on the shuttle for reciprocal movement on the base between the first and second positions and a third position that aligns the third insertion tool between the ram and the backup tool; and the workpiece positioner is supported adjacent the ram and is configured to sequentially move the workpiece into a third plurality of receiving positions when the shuttle is in the third position such that each receptacle of the third plurality of receptacles is sequentially aligned with the ram between the third insertion tool and the backup tool.

8. A seat and guide installation apparatus as defined in claim 7 in which;

the first insertion tool is configured to hold intake seats;

the second insertion tool is configured to hold exhaust seats;

the third insertion tool is configured to hold valve guides for press fit insertion;

the first insert magazine is configured to successively align each intake seat of a plurality of intake sea with the first insertion tool;

the second insert magazine is configured to successively align each of a plurality of exhaust seats with the second insertion tool;

the third insert magazine is configured to align each valve guide of a plurality of valve guides with the third insertion tool;

the workpiece positioner is configured to sequentially align each of a plurality of intake seat bores of an engine head with the first insertion tool;

the workpiece positioner is configured to sequentially align each of a plurality of exhaust seat bores of the head with the second insertion tool; and the workpiece positioner is configured to sequentially align each of a plurality of valve guide bores of the head with the third insertion tool.

9. A seat and guide installation apparatus as defined in claim 7 in which the workpiece positioner is configured to:

remove each of a plurality of workpieces from a workpiece conveyor;

move each workpiece through the first, second and third pluralities of receiving positions for press fit insertion of respective first, second and third pluralities of inserts; and to deposit each workpiece on a discharge conveyor when press fit insertion is complete.

10. A seat and guide installation apparatus as defined in claim 7 in which:

first, second and third hoppers are disposed remote from the ram;

the shuttle is movable to a reload position in which the first, second and third magazines are positioned adjacent the first, second and third hoppers, respectively; and the hoppers are configured to feed respective first, second and third pluralities of inserts into the respective first, second and third insert magazines when the shuttle is in the reload position.

11. A seat and guide installation apparatus for press fitting valve seats and valve guides into corresponding receptacles in a plurality of internal combustion engine heads or engine cylinder blocks, the apparatus comprising:

a press comprising a ram supported on a base and a backup tool supported on the base and spaced from the ram;

a first insertion tool supported on the base, alignable between the ram and the backup tool and configured to sequentially press fit each insert of one of a first plurality of valve guide inserts and a first plurality of valve seat inserts into a corresponding one of a plurality of complementary receptacles in one of an engine cylinder head workpiece and an engine cylinder block workpiece, the ram being configured and positioned to repeatedly engage the insertion tool to individually press fit each insert of the first plurality of inserts into respective ones of the complementary receptacles, the backup tool being configured to support the workpiece against the force of press-fit insertion;

a first insert magazine supported on the base and configured to sequentially move each of the first plurality of inserts relative to and into alignment with the first insertion tool when aligned with the ram; and a movable workpiece positioner supported adjacent the press and configured to sequentially move the same workpiece including the complementary receptacles relative to the ram and first insertion tool into a first plurality of receiving positions such that each receptacle of the complementary receptacles of the same workpiece is moved sequentially relative to and into alignment with the first insertion tool when aligned with the ram and between the first insertion tool and the backup tool.

12. A seat and guide installation apparatus for press fitting inserts into corresponding receptacles in a plurality of workpieces, the apparatus comprising:

a press comprising a ram supported on a base and a backup tool supported on the base and spaced from the ram;

a first insertion tool supported on the base, alignable between the ram and the backup tool and configured to sequentially press fit each insert of a first plurality of inserts into a corresponding complementary receptacle in a workpiece, the ram being configured and positioned to repeatedly engage the insertion tool to individually press fit each insert of the first plurality of inserts into respective ones of the complementary receptacles, the backup tool being configured to support the workpiece against the force of press-fit insertion;

a first insert magazine supported on the base and configured to sequentially align each of the first plurality of inserts with the first insertion tool;

a workpiece positioner supported adjacent the press and configured to sequentially move a workpiece including the complementary receptacles into a first plurality of receiving positions such that each receptacle of the complementary receptacles is moved sequentially into alignment with the first insertion tool between the ram and the backup tool;

a second insertion tool supported on the base and configured to hold each insert of a second plurality of like inserts for individual press fit insertion into respective complementary receptacles of a second plurality of receptacles in the workpiece; and a second insert magazine configured to successively align each insert of the second plurality of inserts with the second insertion tool, the first and second insertion tools and first and second insert magazines being supported on a shuttle for reciprocal movement on the base between a first position aligning the first insertion tool between the ram and backup tool and second position aligning the second insertion tool between the ram and the backup tool, the workpiece positioner being supported adjacent the ram and backup tool and configured to sequentially move the workpiece into a second plurality of receiving positions when the shuttle is in the second position such that each receptacle of the second plurality of receptacles is sequentially movable into alignment with the ram between the second insertion tool and the backup tool.

* * * * *